United States Patent
Shamoo

[15] 3,676,360
[45] July 11, 1972

[54] LIQUID SCINTILLATORS

[72] Inventor: Adil E. Shamoo, 32-32 32nd St., Astoria, N.Y. 11106

[22] Filed: June 30, 1971

[21] Appl. No.: 158,554

Related U.S. Application Data

[63] Continuation-in-part of Ser. No. 874,979, Nov. 7, 1969, abandoned.

[52] U.S. Cl. .................252/301.2 R, 250/71, 250/71.5, 250/83, 250/83.1
[51] Int. Cl. .........................................G01t 1/20, C09k 1/02
[58] Field of Search .................252/301.2 R, 83, 83.1, 71, 252/71.5

[56] References Cited

UNITED STATES PATENTS 3,573,218  3/1971  Benson ..........................252/301.2

OTHER PUBLICATIONS

Blair et al., Anal. Biochem. 3(1962) p. 221–229.
Findeis et al., Molecular Crystals, 1968, Vol. 4, p. 385–388.

*Primary Examiner*—Tobias E. Levow
*Assistant Examiner*—A. P. Demers
*Attorney*—Alvin Sinderbrand et al.

[57] ABSTRACT

The counting efficiency of liquid scintillators containing toluene as the solvent for a primary solute or activator and for a secondary solute or spectrum shifter is improved, particularly in the presence of water, for example, when the isotope to be detected is an aqueous solution, by adding to the liquid scintillator a hygroscopic substance which is soluble in toluene in an amount sufficient to absorb and/or emulsify the water that is present. Such hygroscopic additive is preferably cellulosic and may be selected from the group consisting of cellulose, carboxymethyl cellulose, cellulose phosphate, diethylaminoethyl cellulose, benzyl diethylaminoethyl cellulose and epichlorohydrin triethanolamine cellulose. The additive for improving the counting efficiency may advantageously include, apart from the cellulose and/or cellulose derivative, a small amount of sodium or calcium carbonate or bicarbonate. The improvement in counting efficiency resulting from the mentioned addition is particularly large when the scintillators liquid includes alcohol as well as toluene.

12 Claims, No Drawings

LIQUID SCINTILLATORS

This application is a continuation-in-part of my copending application for U.S. Letters Patent, Ser. No. 874,979, filed Nov. 7, 1969 now abandoned.

This invention relates generally to liquid scintillators, and is particularly directed to improvement of the counting efficiency of liquid scintillators which employ toluene as the solvent for the primary and secondary solutes thereof.

Liquid scintillators are commercially available for use in the detection of nuclear radiation, particularly beta radiation, by means of liquid scintillation counters, for example, of the type referred to by the designation Beckman LS230. These liquid scintillators comprise a solvent, usually either toluene or dioxane, containing a primary solute or activator, such as PPO (2,5-diphenyl-oxazole), which collects the energy absorbed by the solute and emits ultraviolet radiation, and a secondary solute or spectrum shifter, such as, POPOP[1,4-bis 2-(5-phenyloxazolyl)-benzene], which converts the ultraviolet radiation emitted by the activator into visible light which is detectable by a photomultiplier tube.

Although toluene based scintillators are generally preferred to dioxane based scintillators for reasons given below, the toluene based scintillators have the important disadvantage of experiencing a major reduction of counting efficiency or quenching when even small amounts of water are present in the scintillator, for example, when the isotope whose radiation is to be detected is present in an aqueous solution. This quenching action increases with decreases in the level of the nuclear energy to be detected, and therefore leads to great difficulties in detecting low energy nuclear radiation, for example, from $^3H$ in aqueous solution. The described quenching action occurs when the amount of water introduced into the toluene based scintillator is as small as a few microliters of water in 10 cc of toluene.

In the article entitled "Use of Filter Paper Mounting for Determination of the Specific Activity of Gluconate —$C^{14}$ by Liquid Scintillation Assay" by Alberta Blair and Stanton Segal, appearing in Analytic Biochemistry 3, (1962), at pages 221 to 229, the problem of liquid scintillation assay of substances, such as potassium gluconate —$C^{14}$, that are insoluble in systems usually employed for water-soluble compounds was discussed. The article proposed that the isotope-containing gluconate solution be applied to filter paper while directing a jet of warm air against the area of the paper spotted with the solution, whereby to evaporate the solvent including any water contained therein and to leave the crystalline gluconate —$C^{14}$ impregnated or locked in the filter paper. The thus impregnated filter paper was then immersed in the scintillation liquid constituted by PPO and POPOP in toluene and counting effected in a conventional liquid scintillation counter. At the conclusion of the counting, the filter paper was removed from the scintillation liquid and no $C^{14}$ activity was detected in the latter indicating that the gluconate —$C^{14}$ remained impregnated in the filter paper and that there was not any appreciable disolving of the cellulose of the filter paper in the scintillation liquid. Further, the identified article suggested that, after counting, the filter paper could be repeatedly washed with toluene to remove traces of phosphor therefrom leaving the gluconate to be eluated with water and crystallized from solution for further degradative procedures. This, it is clear that Blair and Segal did not seek to avoid the reduction of counting efficiency or quenching that is encountered in the use of scintillation liquid based on toluene when the isotope to be detected is present in an aqueous solution that is merely introduced into the scintillation liquid.

Although dioxane based scintillators are not quenched by the presence of such small amounts of water, and hence have been used when the isotope to be detected and measured is in an aqueous solution, such dioxane based scintillators have a number of important disadvantages. Among these disadvantages are: the production of chemiluminescence when proteins or the like are present in the aqueous solution containing the source of nuclear radiation, whereby the accuracy of the measurement of the nuclear radiation is disturbed; a substantial quenching action when substances other than water are added to the liquid scintillator; and instability at room or ambient temperatures, so that dioxane based scintillators might require the use of refrigerated liquid scintillation counters.

Accordingly, it is an object of this invention to provide liquid scintillators which avoid the above mentioned disadvantages of the existing toluene and dioxane based scintillators.

Another object is to provide toluene based scintillators which are not substantially quenched by the presence of water therein so that such toluene based scintillators can be effectively employed for the detection and measurement of even low energy nuclear radiation from sources in aqueous solutions.

In accordance with this invention, the quenching of toluene based scintillators by the presence of water therein is minimized and the counting efficiency is substantially improved by adding to the toluene based scintillator a hygroscopic, preferably cellulosic substance which is soluble in the toluene in an amount sufficient to absorb and/or emulsify at least a substantial part of the water that is present. The additive for improving the counting efficiency of the toluene based scintillator in the presence of water may consist of one or more of such cellulosic substances, or of the combination of the latter with similarly small amounts of sodium or calcium carbonate or bicarbonate.

The toluene based scintillators having their counting efficiencies improved by the additives according to this invention, particularly in the presence of water, may contain PPO as the primary solute, in concentrations of 4 to 30 gm/liter of toluene and POPOP as the secondary solute, in concentrations of 0.1 to 1.0 gm/liter of toluene. The amount of the cellulosic substance added to prevent, or at least substantially minimize the quenching by the presence of water is preferably at least sufficient to absorb and/or emulsify all of the water to be introduced into the liquid scintillator, and the maximum amount of the cellulosic substance is preferably no more than the amount that will saturate the toluene based scintillator therewith. In the case of a toluene based scintillator containing 4 gm. of PPO and 0.5 gm. of POPOP dissolved in 1.0 liter of toluene, 1 gm. of the cellulosic substance per liter of toluene is sufficient to absorb and/or emulsify 15 microliters of water per 10 c.c. of the toluene based scintillation liquid. The increase in counting efficiency of the scintillator is not adversely affected by an increase in the amount of the additive beyond that required for absorbing and/or emulsifying the water content up to an additive concentration of about 10 gm per liter of toluene based scintillator. Substantially beyond the foregoing maximum concentration of the additive, a progressive quenching action is encountered.

Among the cellulosic substances that have been found to be particularly suitable for increasing the counting efficiencies of toluene based scintillators, particularly in the presence of water, are cellulose, carboxymethyl cellulose (CMC), cellulose phosphate, diethylaminoethyl cellulose (DEAE-cellulose), benzyl-diethylaminoethyl cellulose (benzyl-DEAE-cellulose) and epichlorohydrin triethanolamine cellulose (ECTEOLA-cellulose).

It has been found that the relative improvement in counting efficiency of toluene based scintillators, particularly in the presence of water, achieved by the additions thereto according to this invention increases as the energy of the nuclear radiation to be detected decreases. Thus, the relative improvement of counting efficiency with $^3H$ as the radiation source will be greater than the relative improvement with $^{14}C$ as the source, and the relative improvement with $^{14}C$ as the source will be greater than the relative improvement with $^{32}P$ as the source. More particularly, when the radiation source is $^{32}P$ in aqueous solution, the counting efficiency of a toluene based scintillator is increased by 20-30% by the inclusion of additives according to this invention, whereas the same scintillator undergoes increases in counting efficiency of the order of 100–200 percent and 200–900 percent when $^{14}C$ and $^3H$ are the radiation sources, respectively. Therefore, toluene based scintillators with additives according to this invention are particularly suited for detecting and measuring radiation from low energy sources, such as $^3H$, in aqueous solutions.

Further, it has been found that the increase in counting efficiency is greatest when, in addition to the cellulosic additive, the toluene based liquid scintillator has included therein a substantial quantity of an alcohol, for example, from 100 to 400 c.c. of absolute alcohol per liter of toluene. This is surprising in view of the disclosure of the quenching properties of alcohols in liquid scintillator solutions by A.F. Findeis and J.A. Lubkowitz appearing at pages 385–401 of Molecular Crystals, 1968 Vol. 4, published by Gordon and Breach Science Publishers.

When toluene based scintillators have additives included therein to increase the counting efficiency thereof, particularly in the presence of water, according to this invention, the background counts are unchanged, that is, the background counts are the same with and without the additives. Further, the increased counting efficiency is stable, that is, the counts resulting from the increased efficiency remain unchanged when testing the same samples with the same scintillators for at least one week after the incorporation of the described additives therein.

The exact mechanism by which the additives introduced into toluene based scintillators according to this invention serve to increase the counting efficiency thereof in the presence of water is not fully understood. However, it is believed that such additives, when dissolved in the toluene, or partly dissolved and partly suspended in the toluene in the case of an amount of the additive greater than that required to actuate the toluene, collect or absorb the small amount of aqueous solution containing the radiation source material and thereby promote improved mixing or emulsifying of the aqueous solution with the toluene. By reason of such improved mixing, the droplets of water are reduced in size, whereby the beta radiation from the isotope contained in the droplets of water collected by the dissolved additive travels over relatively shorter path lengths into the toluene so that the latter solvent for the activator (PPO) and the specrrum shifter (POPOP) can more efficiently absorb such radiation.

The invention will now be further described with reference to the following examples which are merely illustrative:

EXAMPLE I

A. A toluene based scintillator containing 4 gm. of PPO and 0.5 gm. of POPOP dissolved in 1.0 liter of toluene was employed in a Beckman LS230 liquid scintillation counter, and beta radiation sources or samples (a), (b), (c), (d), (e) and (f) constituted by progressively larger amounts of $^{14}C$ were introduced into the toluene based scintillator, in the absence of water, with the counts per minute (CPM) indicated by the counter being read for each sample.

B. The foregoing tests were repeated for each sample, but with each of the samples (a), (b), (c), (d), (e) and (f) being present in 15 microliters of an aqueous solution which is introduced into 10 c.c. of the toluene based scintillator.

C. The tests indicated in B above were repeated, but with the aqueous solutions of the several radiation source samples being introduced into a toluene based scintillator having the composition indicated above and to which there was added carboxymethyl cellulose (CMC) in a concentration of about 10 gm. per liter of toluene so as to obtain a saturated solution of the CMC in toluene, with such amount of CMC being sufficient to substantially absorb the water present.

The results of the above tests IA, IB and IC were as follows:

| Radiation Sample | Counts Per Minute (CPM) | | | Percent improvement of IC over IB |
|---|---|---|---|---|
| | Test IA | Test IB | Test IC | |
| a | 80 | 85 | 132 | 55.6 |
| b | 1795 | 1075 | 1973 | 83.6 |
| c | 3085 | 1910 | 3366 | 76.3 |
| d | 6370 | 2653 | 5620 | 112.0 |
| e | 15470 | 6444 | 12850 | 99.6 |
| f | 22320 | 5580 | 13020 | 133.3 |

From the above, it will be apparent that the presence of water in the known toluene based scintillator (Test IB) has a substantial quenching action and that such quenching action is substantially minimized and the counting efficiency is very greatly improved by the addition to the toluene based scintillator of carboxymethyl cellulose (Test IC).

EXAMPLE II

Tests IC above were repeated, but with the carboxymethyl cellulose additive being replaced by a substantially equal amount of cellulose phosphate, and the results were as follows:

| Radiation Sample | CPM Test II | % improvement of II over IB |
|---|---|---|
| a | 119 | 40 |
| b | 1507 | 40.2 |
| c | 3195 | 67.3 |
| d | 4140 | 56 |
| e | 9570 | 48.6 |
| f | 8920 | 59.8 |

EXAMPLE III

Tests IC above were repeated, but with the carboxymethyl cellulose additive being replaced by a substantially equal amount of cellulose, and the results were as follows:

| Radiation Sample | CPM Test III | % improvement of III over IB |
|---|---|---|
| a | 122 | 43.5 |
| b | 2150 | 100. |
| c | 3200 | 67.5 |
| d | 3710 | 39.9 |
| e | 7970 | 23.7 |
| f | 8930 | 60 |

EXAMPLE IV

Test IC above were repeated, but with the carboxymethyl cellulose additive being replaced by a substantially equal amount of diethylaminoethyl cellulose, and the results were as follows:

| Radiation Sample | CPM Test IV | % improvement of IV over IB |
|---|---|---|
| a | 153 | 80 |
| b | 2010 | 86.8 |
| c | 2805 | 46.8 |
| d | 3925 | 48 |
| e | 8000 | 24.2 |
| f | 9300 | 48.7 |

EXAMPLE V

Tests IC above were repeated, but with the carboxymethyl cellulose being replaced by a substantially equal amount of benzyl diethylaminoethyl cellulose, and the results were as follows:

| Radiation Sample | CPM Test V | % improvement of V over IB |
|---|---|---|
| a | 106 | 24.7 |
| b | 1290 | 20.0 |
| c | 1850 | -0.3 |
| d | 3710 | 39.9 |
| e | 6720 | 4.3 |

| f | 9300 | 66.7 |

EXAMPLE VI

Tests IC above were repeated, but with the carboxymethyl cellulose being replaced by a substantially equal amount of epichlorohydrin triethanolamine cellulose (ECTEOLA), and the results were as follows:

| Radiation Sample | CPM Test VI | % improvement of VI over IB |
| --- | --- | --- |
| a | 92 | 8.2 |
| b | 1440 | 33.9 |
| c | 2805 | 46.9 |
| d | 5830 | 120. |
| e | 14200 | 120. |
| f | 19350 | 243 |

EXAMPLE VII

Tests IC above were repeated, but with the additive to the toluene based scintillator also containing an amount of epichlorohydrin triethanolamine cellulose substantially equal to the amount of the carboxymethyl cellulose additive and the results were as follows:

| Radiation Sample | CPM Test VII | % improvement of VII over IB |
| --- | --- | --- |
| a | 106 | 24.7 |
| b | 1580 | 46.8 |
| c | 3140 | 64.4 |
| d | 6360 | 140. |
| e | 15450 | 140. |
| f | 21600 | 287. |

EXAMPLE VIII

Tests IA, IB and IC were repeated as tests VIIIA, VIIIB and VIIIC, respectively, but using beta radiation sources or samples (g), (h), (i) and (j) constituted by progressively larger amounts of $^3H$, and the results thereof were as follows:

| Radiation Sample | CPM Test VIIIA | Test VIIIB | Test VIIIC | % improvement of VIIIC over over VIIIB |
| --- | --- | --- | --- | --- |
| g | 1630 | 272 | 1390 | 510 |
| h | 2420 | 298 | 2230 | 750 |
| i | 4280 | 520 | 3760 | 725 |
| j | 7760 | 796 | 6960 | 875 |

The above results demonstrate that, when using low energy beta emitters, such as $^3H$, the quenching effect due to the presence of water in the toluene based scintillator is very large (compare results of VIIIB with VIIIA), and further that, in the case of such low energy beta emitters, the additives introduced into the toluene based scintillator, are particularly effective in minimizing such quenching effect and in achieving a counting efficiency approaching that realizable with the toluene based scintillator in the absence of water.

EXAMPLE IX

The test with radiation sample (d) in Example VI was repeated, but with the further addition to the toluene base scintillator of 250 c.c. of absolute alcohol for each liter of toluene, and there was indicated 8,500 CPM. This is to be compared with 6,370 CPM in the case of Test IA (no additive and in the absence of water), 2,653 CPM in the case of Test IB (no additive in the presence of water) and 5,830 CPM in the case of Test VI (epichlorhydrin triethanolamine cellulose as the additive in a scintillator having only toluene as its solvent). Thus, by the addition of alcohol to the scintillator the counting efficiency was improved by about 310 percent over that of the toluene based scintillator alone in the presence of water.

EXAMPLE X

The test with radiation sample (d) in Example VI was repeated, but with the further addition to the toluene based scintillator of calcium carbonate in an amount of about 1 gm. per liter of toluene, and there was indicated about 8,750 CPM, representing approximately a 150 percent improvement in counting efficiency over that realized with the addition to the toluene based scintillator of epichlorohydrin triethanolamine cellulose alone. Similar results were obtained with the addition to the toluene based scintillator of calcium bicarbonate, sodium carbonate or sodium bicarbonate in addition to the epichlorohydrin triethanolamine cellulose.

EXAMPLE XI

The tests described in Example I were repeated with other beta radiation sources or samples (a), (b), (c), (d) and (e) containing progressively larger amounts of $^{14}C$. As before, such tests involved a series (A) in which the samples were introduced into the described toluene based scintillator in the absence of water, a series (B) in which each sample was present in 15 microliters of an aqueous solution introduced into 10 c.c. of the toluene based scintillator, and a series (C) in which the aqueous solutions of the several radiation source samples were introduced into the toluene based scintillator to which there was added carboxymethyl cellulose (CMC) in a concentration of about 1 gm. per liter of toluene.

The results of the above tests XIA, XIB and XIC were as follows:

| Radiation Sample | Counts Per Minute (CPM) | | | % improvement of XIC over XIB |
| --- | --- | --- | --- | --- |
| | Test XIA | Test XIB | Test XIC | |
| a | 1630 | 1001 | 1750 | 74.8 |
| b | 2900 | 1810 | 3113 | 71.9 |
| c | 5800 | 2450 | 5253 | 114.4 |
| d | 14450 | 6212 | 11909 | 91.7 |
| e | 23076 | 6560 | 13115 | 99.9 |

EXAMPLE XII

The series of tests identified as XIC above were repeated, but with the carboxymethyl cellulose (CMC) being added to the toluene based scintillator in a concentration of about 10 gm. per liter of toluene, and the results were as follows:

| Radiation Sample | CPM Test XII | % improvement of XII over XIB |
| --- | --- | --- |
| a | 1757 | 75.5 |
| b | 3120 | 72.3 |
| c | 5265 | 114.8 |
| d | 11901 | 91.5 |
| e | 13230 | 101.6 |

This demonstrates that merely increasing the concentration of CMC in the toluene based scintillator from 1 gm. to 10 gm. per liter of toluene does not materially alter the increase in counting efficiency attained by this invention. However, as demonstrated by the following examples, the advantages of this invention are not realized and, in fact, the added cellulosic substance has a quenching action of its own that reduces the counting efficiency below that encountered with the toluene based scintillator alone in the presence of water, if the amount of added cellulosic substance very substantially exceeds the amount that can be dissolved in the toluene.

EXAMPLE XIII

The series of tests identified as XIC above were repeated, but with the CMC being added to the toluene based scintillator in a concentration of 100 gm. per liter of toluene, and the results were as follows:

| Radiation Samples | CPM Test XIII | % Improvement of XIII over XIB |
|---|---|---|
| a | 852 | −14.8 |
| b | 1113 | −38.5 |
| c | 1645 | −32.9 |
| d | 3223 | −48.1 |
| e | 4163 | −36.5 |

EXAMPLE XIV

The series of tests identified as XIC above were repeated, but with the CMC being added to the toluene based scintillator in a concentration of 200 gm. per liter of toluene, and the results were as follows:

| Radiation Samples | CPM Test XIV | % Improvement of XIV over XIB |
|---|---|---|
| a | 830 | −17.1 |
| b | 1003 | −44.6 |
| c | 1200 | −51.0 |
| d | 2301 | −62.9 |
| e | 2778 | −57.6 |

It will be apparent that, in accordance with this invention, very substantial improvements are effected in the counting efficiency of toluene based scintillators in the presence of water.

In the specific applications of the invention presented in the above examples, the cellulosic additive has been described as being introduced into the toluene based scintillator prior to the introduction of the beta emitter in aqueous solution. However, it is contemplated that the cellulosic additives mentioned herein may be provided in sheet form, so that a sheet of such cellulosic material may be used to wipe a surface suspected of being contaminated with a beta emitter after wetting such surface with water. Then, the sheet of cellulosic material which has absorbed the water and picked up any contaminant from the suspected surface is dissolved in the toluene based scintillator and the presence of any beta emitting contaminant is detected in a liquid scintillation counter. Of course, the cellulosic material in sheet form must be capable of being readily dissolved in the toluene based scintillator, and the amount of such material should be sufficient to absorb the water present and not greatly in excess of the amount of the cellulosic material that can be dissolved in the toluene based scintillator.

Although illustrative examples of the invention have been described in detail herein, it should be understood that the invention is not limited to those precise examples and that various changes and modifications can be effected therein by one skilled in the art without departing from the scope or spirit of the invention.

What is claimed is:

1. In a liquid scintillator having an activator and a spectrum shifter dissolved in toluene and being adapted to detect beta radiation in the presence of water, a hygroscopic substance added to said liquid scintillator in an amount sufficient to substantially absorb said water that is present and being soluble in said toluene at least in said amount, said hygroscopic substance being selected from the group consisting of cellulose, carboxymethyl cellulose, cellulose phosphate, diethylaminoethyl cellulose, benzyl diethylaminoethyl cellulose, epichlorohydrin triethanolamine cellulose, and mixtures thereof.

2. A liquid scintillator according to claim 1, in which said amount of the hygroscopic substance is sufficient to provide a saturated solution thereof in said toluene.

3. A liquid scintillator according to claim 1, in which said amount of the hygroscopic substance is in the range between substantially 1.0 and 10.0 gm. per liter of said toluene.

4. A liquid scintillator according to claim 1, in which there is further added, in an amount approximately equal to that of said hygroscopic substance, a substance selected from the group consisting of calcium carbonate and bicarbonate and sodium carbonate and bicarbonate.

5. A liquid scintillator according to claim 1, in which alcohol is added to said scintillator in an amount between 100 and 400 c.c. per liter of said toluene.

6. A liquid scintillator according to claim 1, in which said activator is 2,5-diphenyl-oxazole and said spectrum shifter is 1,4-bis2-(5-phenyloxazolyl)benzene.

7. A method of improving the counting efficiency, in the presence of water, of a liquid scintillator having an activator and a spectrum shifter dissolved in toluene, comprising introducing into said liquid scintillator a hygroscopic substance in an amount sufficient to substantially absorb said water that is present and being soluble in said toluene at least in said amount, said hygroscopic substance being selected from the group consisting of cellulose, carboxymethyl cellulose, cellulose phosphate, diethylaminoethyl cellulose, benzyl diethylaminoethyl cellulose, epichlorohydrin triethanolamine cellulose, and mixtures thereof.

8. The method according to claim 7, in which said amount of the hygroscopic substance is sufficient to provide a saturated solution thereof in said toluene.

9. The method according to claim 7, in which said amount of the hygroscopic substance is in the range between substantially 1.0 and 10.0 gm. per liter of said toluene.

10. The method according to claim 7, in which there is further added, in an amount approximately equal to that of said hygroscopic substance, a substance selected from the group consisting of calcium carbonate and bicarbonate and sodium carbonate and bicarbonate.

11. The method according to claim 7, further comprising adding to said scintillator an amount of alcohol that is between 100 and 400 c.c. thereof per liter of said toluene.

12. The method according to claim 7, in which said activator is 2,5-diphenyl-oxazole and said spectrum shifter is 1,4-bis 2-(5-phenyloxazolyl)-benzene.

* * * * *